Feb. 22, 1927.
W. KASSEBEER
1,618,958
CONTOUR CANE PLANTING MACHINE
Filed Dec. 4, 1924    4 Sheets-Sheet 1
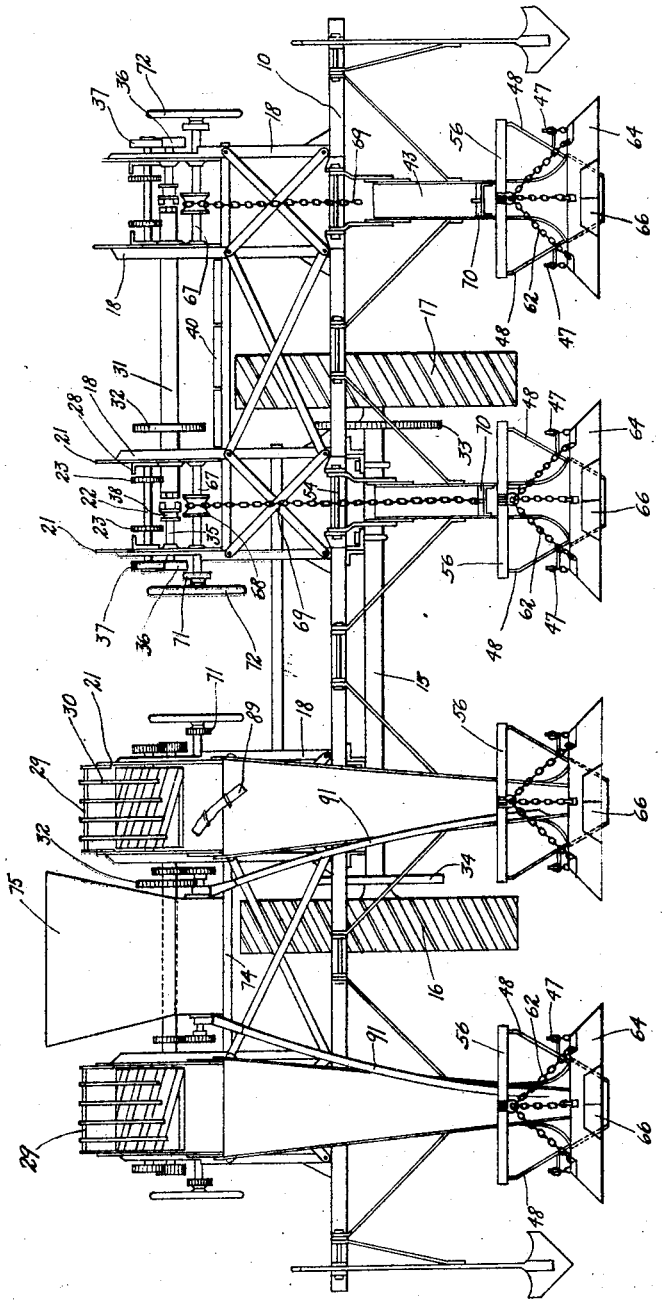
INVENTOR
*W. Kassebeer*
BY
*F. Ledermann*
ATTORNEY

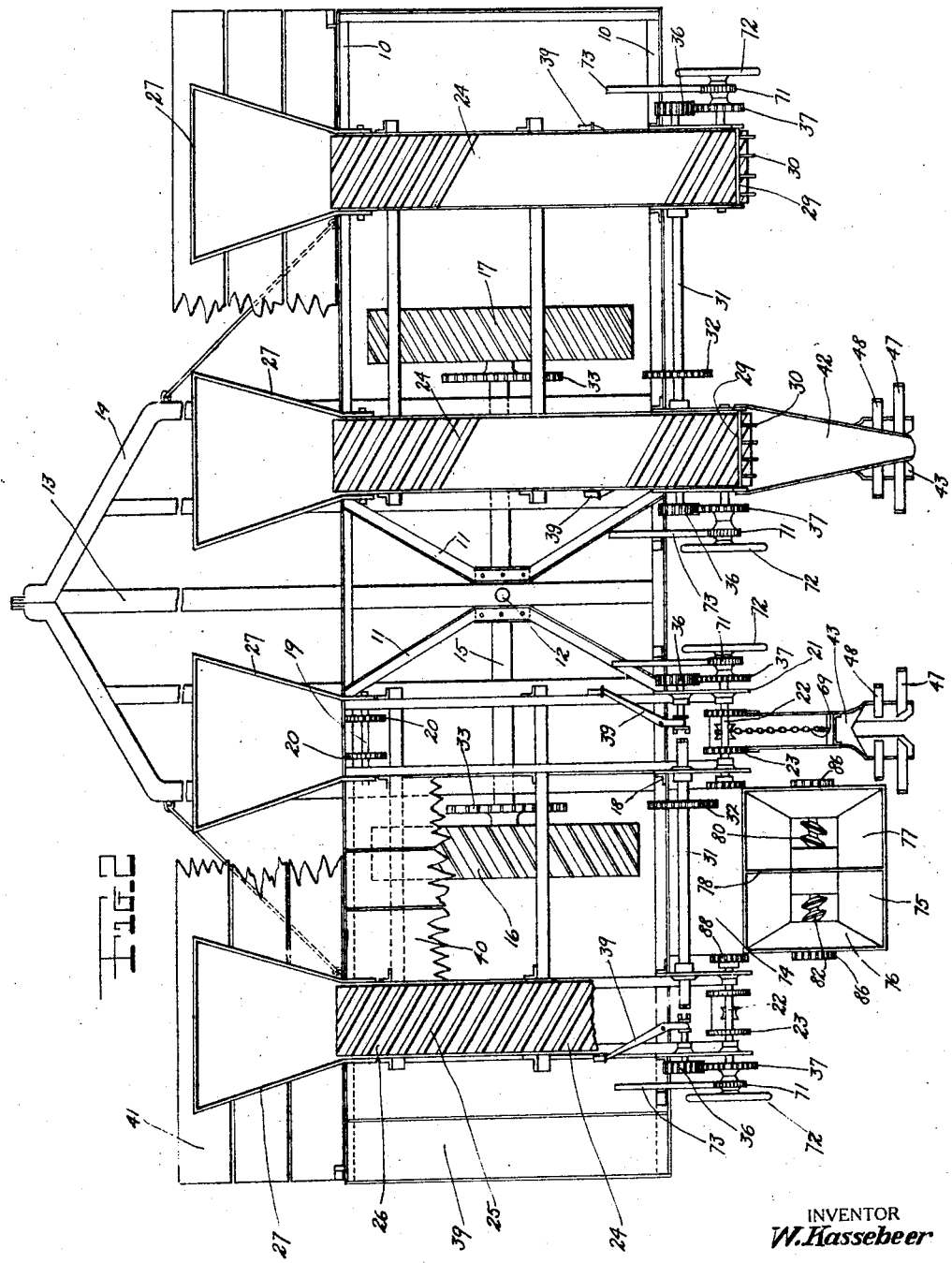

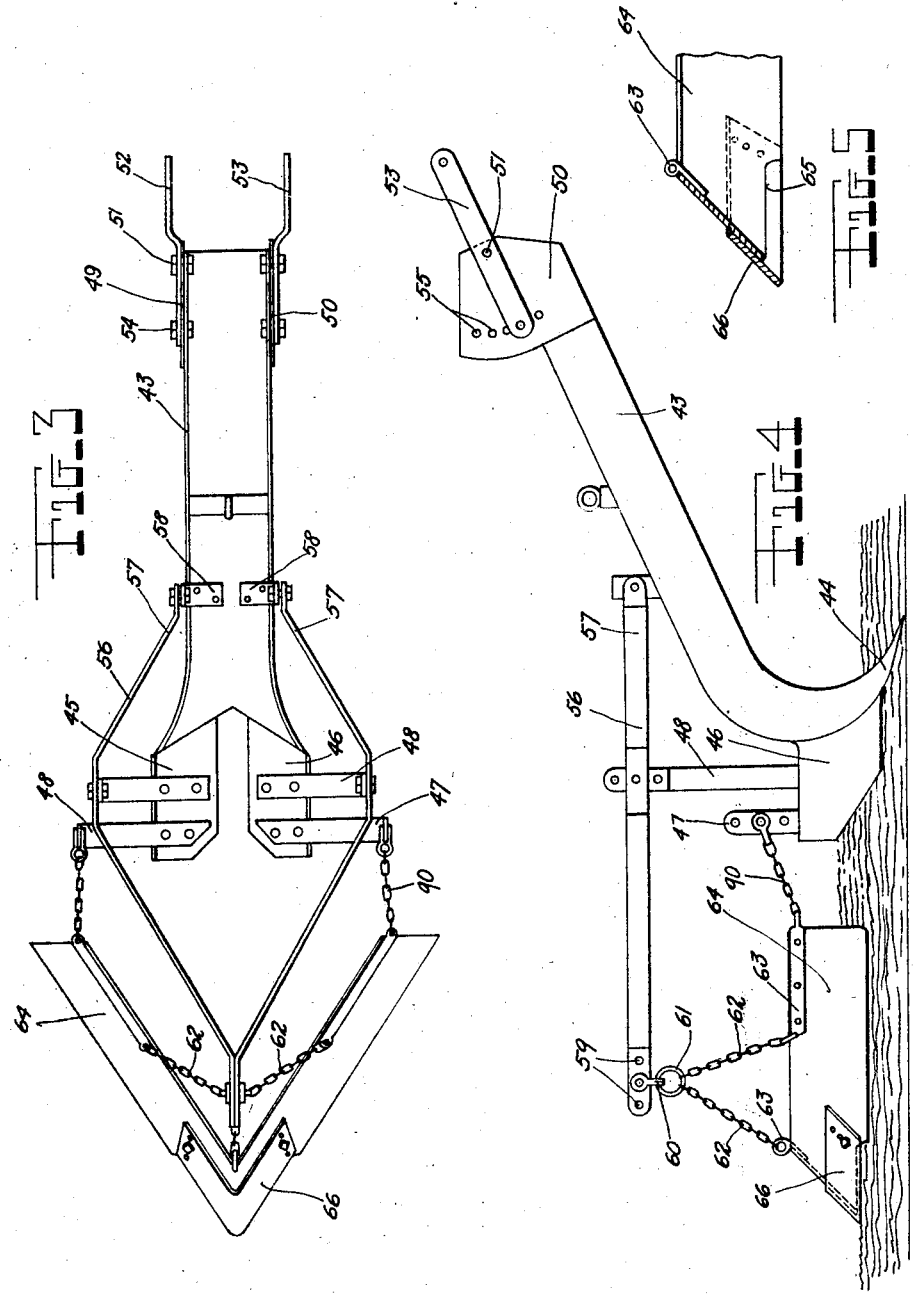

Feb. 22, 1927.
W. KASSEBEER
1,618,958
CONTOUR CANE PLANTING MACHINE
Filed Dec. 4, 1924    4 Sheets-Sheet 4
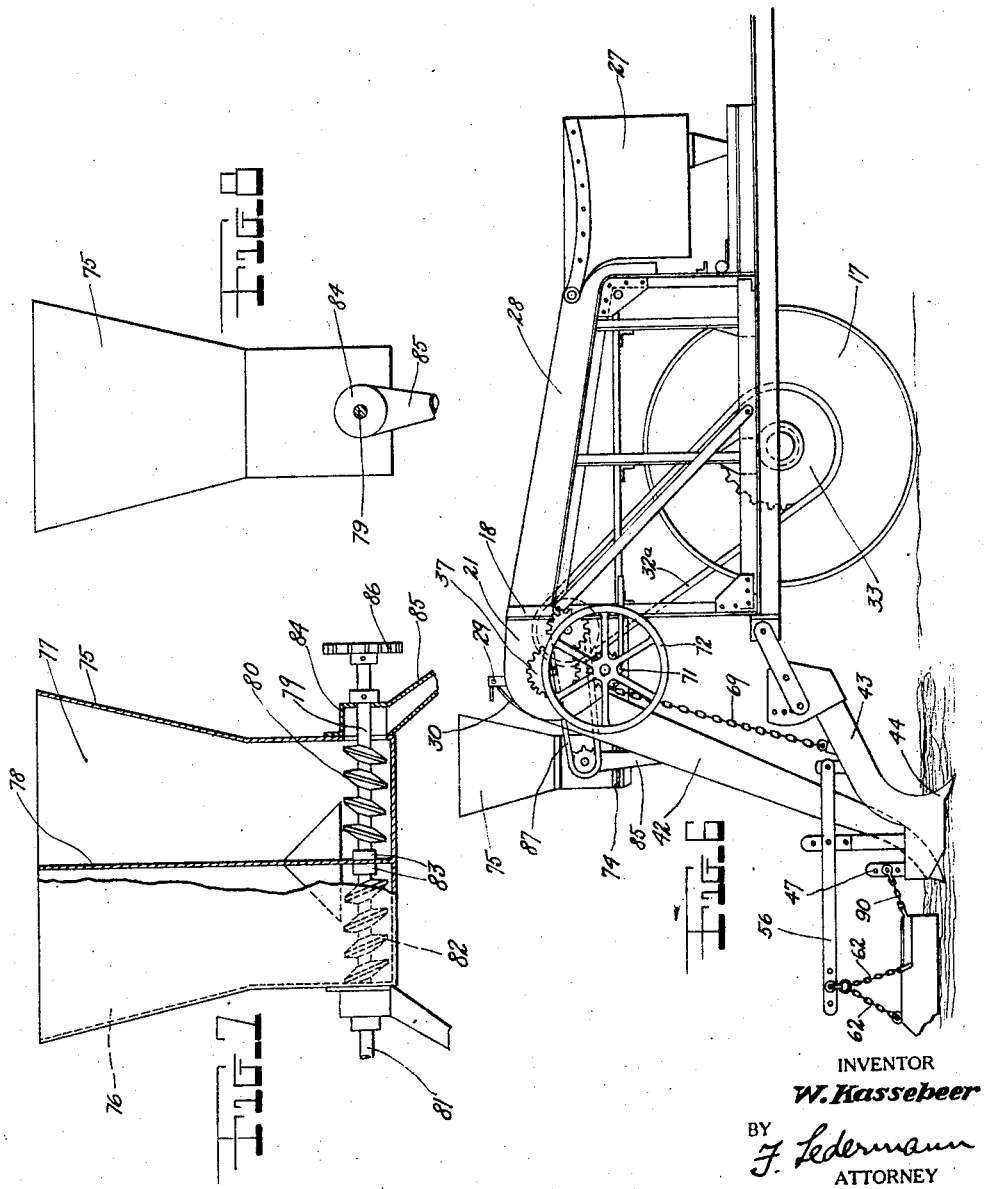
INVENTOR
*W. Kassebeer*
BY
*F. Ledermann*
ATTORNEY Patented Feb. 22, 1927.

1,618,958

UNITED STATES PATENT OFFICE.

WILLIAM KASSEBEER, OF LIHUE, TERRITORY OF HAWAII.

CONTOUR CANE-PLANTING MACHINE.

Application filed December 4, 1924. Serial No. 753,927.

The machine illustrated and described on the following pages is particularly adapted for sugar plantations. It is generally believed that an ordinary plow could be used for forming furrows in which seed cane is planted. A plow, however, could not be used, owing to the particular topography of the land of the usual type of plantation. In general, sugar plantations are located in localities having a moderately warm climate and a long dry season. The surface of the plantation is generally of the rolling type characteristic of plains and similar locations. It is also necessary that ample irrigation be had on sugar cane plantations so that the growing cane is not dependent on the rain fall for its water sustenance to furnish the field planted with sugar cane with water. It is necessary that a main irrigating ditch be formed at a predetermined level, and supply ditches which branch off from the main irrigating ditch, be dug. These supply ditches in turn branch off and communicate with additional ditches or furrows in which the seed cane is planted, or communicate with ditches which are dug between adjacent rows of cane stalks. In the former case, the water flows directly into the furrow in which the seed cane is planted, whereas, in the latter, the soil surrounding the furrow between adjacent rows of cane stalks first absorbs the water and aids in nourishing the plants planted in the rows which adjoin the supply furrow. Due to the topography of the land, which, as previously stated, rolls slightly and has areas at an angle of inclination, these ditches or furrows must be built so that the water therein is capable of complete circulation from the main irrigating ditch thru the supply ditches and thence into the field to circulate finally thru another main irrigating ditch on the opposite side of the field. To provide this system of water circulating ditches, it is necessary that the furrows in which the seed cane is planted be of variously shaped lengths such as straight or irregularly formed contour furrows.

The main purpose of this machine is to provide a contour furrowing machine which is capable of forming any type or outline of furrow desired, the planter being provided with multiple furrow making units calculated to reduce the amount of manual labor required and increase the running feet of furrow made per time unit.

I am aware that cane planters have heretofore been used in the art, but the particular kind of cane planter illustrated in the several drawings is novel over the usual type of cane planter, inasmuch as various features have been provided. The machine is designed to rely upon its own traction wheels for power and is completely mechanically operated. The machine comprises fertilizer units and conveyor units which cooperate and are operable by a single lever, the lever when manipulated being adapted to simultaneously cause operation and measuring out of a given amount of fertilizer at the same instant that the seed cane is being planted, the seed cane being delivered to the planting means by a mechanism which controls planting of the seed cane at regular intervals or spaces.

One of the objects is to provide a novel type of fertilizer unit in which means are provided for transporting a measured amount of fertilizer to a conveyor chute, which delivers the material to the position required.

Another object is to provide a machine capable of contour furrowing or opening a furrow, planting of seed cane lengths at intervals in the furrow, measuring out a quantity of fertilizer, and delivering the same into the furrow around the cane, and covering said furrow after depositing the cane in a simultaneous operation. In previous machines used for the cane planting, the design was such that a single furrow only could be made.

Another object of this invention is to provide a gang of furrow making devices aligned adjacent each other which are capable of forming four furrows, planting four lines of seed cane, fertilizing and covering said furrows at the same time.

Another object is to provide a planter capable of contour furrowing. In the usual type of machine this has not been possible, owing to the fact that the units performing the different operations such as furrowing, seed cane planting, and fertilizing, have not been concentrated. The design of this planter considers this a very important condition. As is well known to those skilled in the art, that lines of furrows are formed which are convenient to the terrain of the land being furrowed. In consequence of rises and falls of the land, or hilliness, the furrows do not follow a straight line and in most cases are curved or contoured. The planter has therefore been designed so that it forms the furrow, delivers the seed cane and fertilizer at the same position, that is, the units performing the different operations are concentrated about a small area which permits the planting machine to form contour furrowing, a function not possible with the usual type of machine.

Another object of the invention is to provide a furrow opener behind which a furrow coverer is attached, the furrow coverer being so designed that it is possible to regulate the amount of soil by which the seed cane is to be covered. In preparing a parcel of land for the reception of seed cane, it often occurs that stumps and stone when coming in contact with the furrow opener, cause the latter to become fractured by stripping the tip or the nose of the furrower.

Another object of this invention is to provide a furrow opener mounted in such a manner that when a stone or a stump is encountered, a bolt is sheared and the furrow opener attachment rises and rides over the stump or stone.

The above and other objects will become apparent in the description below, in which characters of reference refer to like-named parts in the drawing.

Referring briefly to the drawing, Figure 1 is a rear end elevational view of the gang planter, showing the right hand portion of the planter partly dismantled to illustrate the furrow opener lifting means.

Figure 2 is a top plan view of the gang cane planter, showing part of the same dismantled to clearly illustrate the important features of the same.

Figure 3 is a top plan view of the furrow opener and furrow coverer per se.

Figure 4 is a side elevational view of Figure 3.

Figure 5 is a fragmentary view of the rear portion of the furrow coverer, showing the means provided for regulating the amount of soil which is to be reinterred into the furrow.

Figure 6 is a side elevational view of the cane planter.

Figure 7 is a partly sectioned front elevational view of the fertilizer bins, showing the means provided for delivering a desired amount of fertilizer into a delivery chute.

Figure 8 is a side elevational view of Figure 7.

Referring in detail to the drawing, the numerals 10 indicate horizontal angle irons which serve as the main parts of a frame and are retained rigid in their position by cross braces 11. At the intersection of the cross braces 11, a king bolt 12 passes thru the frame and is anchored in an opening of a bar 13 which forms part of a body 14. This body is normally covered by a flooring of level metal plate, which has been omitted from the drawings for the sake of clarity. The body 14 is supported on an axle 15 which is revoluble in its bearings and has traction wheels 16 and 17 rigidly secured thereto at opposite ends. Angle irons 10, serving as the main parts of the frame, support the entire planting devices of the machine. Upright angle irons 18 are mounted and extend upwardly from the frame members 10 and provide skeleton towers between which the seed cane conveyors are mounted. The towers formed nearer the forward end of the planter have horizontal shafts 19 journalled therein, said shafts having a pair of sprocket wheels 20 secured thereto. The tower members 18 extending upwardly from the frame elements 10 at the rear end of the planter have plate brackets 21 extending sidewise therefrom and said plates are adapted to rotatably support shafts 22 on which a pair of sprocket wheels 23 are rigidly mounted. The sprocket wheels 20 at the forward end of the machine and the sprocket wheels 23 at the rear end of the machine are connected by chains not shown on the drawing, upon which an endless flexible rubber or cloth conveyor belt 24 is secured at several places so as to move with the chains. Integral with the rubber belt and on the surface thereof, a plurality of spacer blocks 25 are mounted, said blocks being inclined with respect to the horizontal and are arranged parallel to each other. The spaces 26 between the blocks 25 are adapted to receive the seed cane which is originally contained in seed boxes 27 arranged at the forward ends of the conveyors and pivoted to the conveyor frame 28 so that said seed boxes may be rotated upwardly and supported over the conveyors when the machine is not in use. At the rear ends of the conveyors, ears are formed on the plates 21. Said ears extend vertically and have bars 29 mounted in the ears. The ends of the bars are supported in the ears and extend between them across the width of the conveyor belt 24. Depending from these bars 29 are a plurality of resilient fingers 30 which are curved longitudinally and are adapted to have their ends lie in flexible contact with the spacer blocks 25 of the conveyor belt 24. These fingers 30 are arranged in series of four on the bar 29 and their lower ends are successively longer than each other and on the same line as the inclined spacer blocks 25. These conveyor units mounted on the skeleton towers are actuated in pairs, that is, two conveyors are actuated by a single means. The actuating means comprising a relatively heavy shaft 31 on which a sprocket wheel 32 is rigidly mounted, said sprocket wheel being secured to the shaft between the pair of conveyors and nearer one of the same. The sprocket wheel 32 on the shaft is connected by a chain 32ª to sproket wheels 33 and 34 rigidly mounted on member 15 adjacent the traction wheels 16 and 17. The shafts 31 terminate at a position intermediate between each pair of plates 21 and are provided with recesses which serve as clutch channels. Aligned with the shafts 31 are smaller spindles 35 which are rotatably mounted in one of each pair of plates 21. One of the ends of these spindles has a gear wheel 36 rigidly attached thereto which meshes with gears 37 rigidly mounted on one end of the sprocket wheel shafts 22. A clutch collar 38 is slidably mounted on spindles 35. These clutch collars are rotatable with the spindle and are slidably actuated by levers 39 which are pivotally mounted on the frame of the machine. These clutch collars are adapted to cooperate with the clutch members provided on the ends of the shafts 31 when engaged therewith to rotate the gear 36 and cause the conveyor belts to move thru the medium of the gears 37 which are attached to the sprocket wheel shafts 22. The structure just described refers to the conveyor mechanism which delivers the seed cane from the forward end of the machine to a position where it is released and delivered to the chute which delivers it to the furrow opener. The seed cane is originally lowered into the seed boxes from bogs, and the same is then manually placed in position in the spaces 26 between the blocks 25 on the conveyor belt. The men which form the crew on the machine stand upon the platforms 39 supported between the frames 10, or on the platforms 40 or 41, which are raised above the platform 39.

The plates 21 mounted at the rear end of the planting machine are adapted to support chutes 42 which extend downwardly at an angle of inclination and are pivoted to said plates at their upper ends so that when the furrow opener when being lifted, also lifts the chute to the position where it is not dragged over the surface. The chute 42 is curved at its lower end so that its bottom lies nearly tangent to the surface of the soil. This chute is adapted to deliver the seed cane from the conveyor to the position where it is to be sown and also delivers a quantity of fertilizer at the same time.

The furrowing and furrow covering attachment is shown in Figures 3 to 5, inclusive, and is adapted for the digging of triangular inverted ditches into which the seed cane, of varying lengths is precipitated, the seed cane lying parallel to the ditch. The furrow opener comprises a substantially longitudinally semi-circular length of rigid material 43 whose one end is deformed into a return bend and terminates in a point to provide a digging nose 44. A pair of plates 45 and 46 extend rearwardly from the digging nose and are shaped as vertical walls which are inclined downwardly and provide soil spreaders. These plates serve as bases to which vertical support bars 47 and higher support bars 48 are anchored. The upper forward end of member 43 is provided with a pair of stripper plates 49 and 50. These plates have each a hole near their forward ends thru which a bolt 51 is inserted. Said bolts are mutually aligned and are used to serve as pivots for the connecting levers 52 and 53, the forward end of the latter being provided with holes which receive bolts 54 anchored to the frame of the machine. The opposite ends of the connecting levers are provided with holes which are adapted to receive bolts 54. The stripper plates 15 are provided with a series of openings 55 any of which are aligned with the hole provided in the end of the connecting levers 53 so that the bolt 54 inserted into the hole in the connecting lever may be slipped thru the hole 55 aligned therewith to rigidly secure the levers 53 at two positions on the plate. A rectangular frame 56 is supported at its diagonal corners on the bars 48. This frame is horizontally positioned and its forward ends 57 are connected to brackets 58 by suitable bolts, the brackets 58 being mounted upon the furrow opener member 43. Said rectangular frame 56 has a plurality of holes 59 at its rear end from one of which a hook connection 60 depends. The hook supports the ring 61 from which three chains 62 are suspended. The lower ends of these chains are connected to hook brackets 63 mounted at convenient positions on a hood-like member 64 forming a furrow coverer. Said furrow coverer is of triangular outline, consisting of two inclined side walls which are joined mutually at the rear end. Near the juncture of these inclined walls, a channel 65 is formed and this channel, which is normally covered by a double walled triangularly shaped plate 66 which has a series of holes therein into any of which a bolt mounted on and projecting from the outer surfaces of the walls 64, may be inserted. The furrow opener and furrow coverer may be lifted from the active position in which it is dragged over the surface of the ground to the inactive position raised above the surface of the ground so that no part thereof touches, by additional manually operated means illustrated in the several views. These means comprise shafts 67 which are mounted between the plates 21 and intermediate their length have rollers 68 rigidly mounted thereon. These rollers have a concave periphery and have one end of the chains 69 secured thereto. The chains are suspended downwardly and are connected at their lower ends to yokes 70 which are pivotally mounted on the furrow openers 23. One end of the shafts 67 extend outwardly from the sides of the plates 21 and have a ratchet wheel 71 secured thereto and a hand wheel 72 mounted adjacent the ratchet wheel. These ratchet wheels 71 are engaged by pawl levers 73 which are pivotally mounted on the frame of the machine and are adapted to be thrown out of engagement and into engagement with their respective ratchet wheels manually.

The fertilizer units for delivering a desired amount of fertilizer to the furrow before the latter has been filled in by the coverer are mounted on platforms 74 between each pair of furrow making units. The fertilizer distributor comprises a relatively large bin 75 which is divided into separate compartments 76 and 77 by an intermediate dividing wall 78. The walls 75 of these bins with the exception of the wall 78 dividing the bin into two compartments are inclined so that the fertilizer carried therein easily slides to the bottom. The lower part of the fertilizer bin is provided with rectangular walls forming a box-like structure in which the fertilizer feeding mechanism is located. This feeding mechanism comprises a shaft 79 on which threads 80 having a right hand pitch are formed. In the other chamber 76, a similar shaft 81 is provided on which threads 82 having a left hand pitch are formed. The shafts 79 and 81 extend across both chambers and are rotatably journalled in sleeves 83 at their mutually adjacent ends, the sleeves being mounted on opposite faces of the dividing wall 78. On the opposing faces of the box-like structure from which the ends of the shafts 79 and 81 extend, hollow housings 84 are mounted, from which angular funnels 85 project downwardly. The ends of the shafts 79 and 81 have sprocket wheels 86 secured thereto. These sprocket wheels are connected thru sprocket chains 87 to similar sprocket wheels 88 mounted on the ends of the sprocket wheel shafts 22.

In forming furrows with this machine, sowing seed in the furrows, and depositing fertilizer around the seed cane, the entire machine is drawn over the territory to be planted by a tractor or the like, which is connected to the forward end of the machine. The crew operating the machine stand at different positions on the platforms 41, 40, and 39. Usually the seed cane is of varying lengths around twelve inches and is transported to the tractor in bags which may be carried on any of the available platforms and dumped into the seed boxes as necessity demands, that is, when a seed box becomes empty. One of the crew is stationed between each pair of seed boxes and is instructed to see that each space 26 formed between the spacer blocks 25 of the conveyor belt 24 are filled with a length of seed cane. The conveyor belt is mounted on the sprocket wheels 20, the forward sprocket wheels of each conveyor unit being driven by a shaft 31 thru the medium of a sprocket wheel 32 on the shaft 31 and a sprocket wheel 33 mounted on the axle of the machine. These sprocket wheels convey the belt 24 to the rear of the machine, and as the belt is loaded with lengths of seed cane, the latter are moved rearwardly toward the operating or planting end of the machine. As a length of seed cane arrives at a position at the rear end of the machine where the conveyor belt bends around the periphery of the rear sprocket wheels 23, the cane would fall from its space between the blocks 25 were it not for the fingers 30. This is not desired as the cane is delivered to the furrow parallel to the furrow being made. In order to accomplish the twisting or turning of the seed cane, the spacer blocks on the conveyor belt are set askew on the belt 24, and the fingers are of successively varying lengths but not of the same angle of inclination as the spacer blocks on the conveyor belt. This causes one end of the seed cane to be released and consequently falls, slightly tilting the released end downwardly so that when the remaining portion of that particular length of seed cane is released, this end will fall to the conveyor first and slide down as shown Figure 1, the seed cane being indicated by the numeral 89. The seed cane after being released, then slides down the chute 42 to its lower end, which is securely housed behind the nose 44 of the furrow opener and beneath the surface of the ground in the hollow of the furrow. It will be noted that the machine in being dragged over the ground first opens the furrow, as the nose 44 of the furrow opener is advanced before the seed cane delivering chute 42, thus the nose 44 opens the furrow and the chute immediately following the furrow opener, delivers the seed cane into the furrow. The furrow coverer mounted immediately behind the chute is of triangular formation and collects all the soil which has been lifted from the furrow and piles the same into a triangular mass which falls again into the furrow, thus covering the seed cane. This furrow coverer attachment is supported from the chains 62, but is dragged by chains 90 which are attached to the support bars 47, in order to again dump the loose soil which has been dug from the furrow thereinto. The amount of soil which is used to cover the seed cane can be regulated by an adjustment on member 66 which exposes or conceals the recess 65. When the recess 65 is uncovered, the least amount of soil is dragged over the furrow and slides down the sides of the furrow and covers the cane. By detaching the bolts which retain member 66 on the furrow coverer, said member may be adjusted higher or lower, according to the amount of soil which it is desired to cover the seed cane with. Another important feature of the invention is stripper plates 50 which cooperate with connecting levers 53. In the usual type of plowshare used in making furrows of various depths, the nose 44 is generally fractured by coming in contact with stones or tree stumps, or similar obstructions. The only solution to this difficulty is to cause the nose 44 of the furrow opener 43 to ride over such obstruction, and this is not possible unless the angle at which the nose 44 enters the soil is changed. With this furrow opener, as the nose 44 encounters a stone or similar obstruction, an angular pull is exerted at the longitudinal end of the member 43. As this pull becomes excessive, the bolt 51 is sheared and the upper or forward end of the furrow opener falls to hang suspended vertically from the lever 53, in which position the angle with which the nose 44 enters the soil becomes nearer vertical, and said nose of the furrow opener rides over the impeding object instead of being fractured by it. When the bolt 51 has been sheared, it is necessary to replace the same before the furrow opener can again be used. The fertilizer bins, mounted on the platforms 74 between each pair of planting units, are filled with granulated fertilizer and operate automatically by being rotated thru the sprocket chains 87. As the shafts 22 are rotated, the sprocket wheels 88 at one of the ends thereof, are rotated, and as these sprocket wheels 88 are connected to the sprocket wheels 86 thru suitable chains, the screw shafts 79 and 81 are rotated. It will be noted that the threads formed on the shaft 79 has a right hand pitch, while that on shaft 81 is provided with a left hand pitch. As these shafts are rotated, the threads or screws 80 and 82 formed thereon urge the fertilizer into the hollow housings 84 from which said material falls into the chute thru the funnel 85 to be deposited in the hollow of the funnel. The lower ends of these funnels 85 are connected to flexible hollow tubular elements 91 which extend downwardly at one side of the chute and deliver the fertilizing material directly to the soil where it is desired.

The greatest advantage this machine has to offer is that contour furrowing is possible inasmuch as the furrow making units are arranged parallel to each other and side by side. Contour furrowing would not, however, be possible, were it not for the fact that the furrow making member 43, the chute 42, and the coverer, were arranged over a concentrated area. Due to the concentration of the positions of members heretofore named as planting units side by side, contour furrowing has become feasible.

When a field has been completely plowed and it is desired to lift the planting units above the ground, the hand wheels 72 are rotated manually. These hand wheels are fixed to the shafts 67 and rotate the latter, which have rollers 68 thereon and to which the upper ends of the chains 69 are secured, the lower ends of said chains being connected to a yoke 70 formed on the furrow openers 43. By rotating these hand wheels, the chains are wound upon the rollers 68 and the entire units, including members 43, 42, and 64, are lifted above the ground.

I claim:—

1. In a cane planter, a wheeled vehicle, furrow openers behind the wheels, conveyors adapted to carry seed cane in a horizontal plane, chutes extending from said conveyors to a position behind the furrow openers, a furrow coverer cooperating with the furrow opener for filling said furrow after planting the seed, said conveyor having staggered grooves extending obliquely of the conveyor, means for tilting one end of the seed cane from the horizontal to the vertical when leaving said conveyor comprising a plurality of fingers mounted at the rear and delivering end of the conveyors, said fingers being adapted to successively release the seed cane from one end to the opposite end.

2. In a cane planter, a wheeled vehicle, furrow openers behind the wheels, conveyors adapted to carry seed cane in a horizontal plane, chutes extending from said conveyors to a position behind the furrow openers, a furrow coverer cooperating with the furrow opener for filling said furrow after planting the seed, said conveyor having staggered grooves extending obliquely of the conveyor, means for tilting one end of the seed cane from a horizontal plane to a substantially vertical position when leaving said conveyor comprising a plurality of fingers mounted at the rear and delivering end of the conveyors, said fingers being adapted to successively release the seed cane from one end to the opposite end, said fingers being adapted to contact with the seed cane as the latter is transported around a portion of the end of the conveyors, the fingers being arranged side by side and of successively varying lengths.

3. In a cane planter, a wheeled vehicle, furrow openers behind the wheels, conveyors adapted to carry seed cane in a horizontal plane chutes extending from said conveyors to a position behind the furrow openers, a furrow coverer cooperating with the furrow opener for filling said furrow after planting of the seed, said conveyor having staggered grooves extending obliquely of the conveyor, means for tilting one end of the seed cane from a horizontal plane to a substantially vertical position when leaving said conveyor comprising a plurality of fingers mounted at the rear and delivering end of the conveyors, said fingers being adapted to successively release the seed cane from one end to the opposite end, said fingers being adapted to contact with the seed cane as the latter is transported around a portion of the end of the conveyors, the fingers being arranged side side and of successively varying lengths, the longest finger being positioned near one side of the conveyor at the highest inclination of the groove, said fingers being adapted to successively release a portion of the cane seed to permit dropping of said cane seed one end foremost into the chute of the particular unit.

In testimony whereof I affix my signature.

WILLIAM KASSEBEER.